United States Patent Office 2,941,483
Patented June 21, 1960

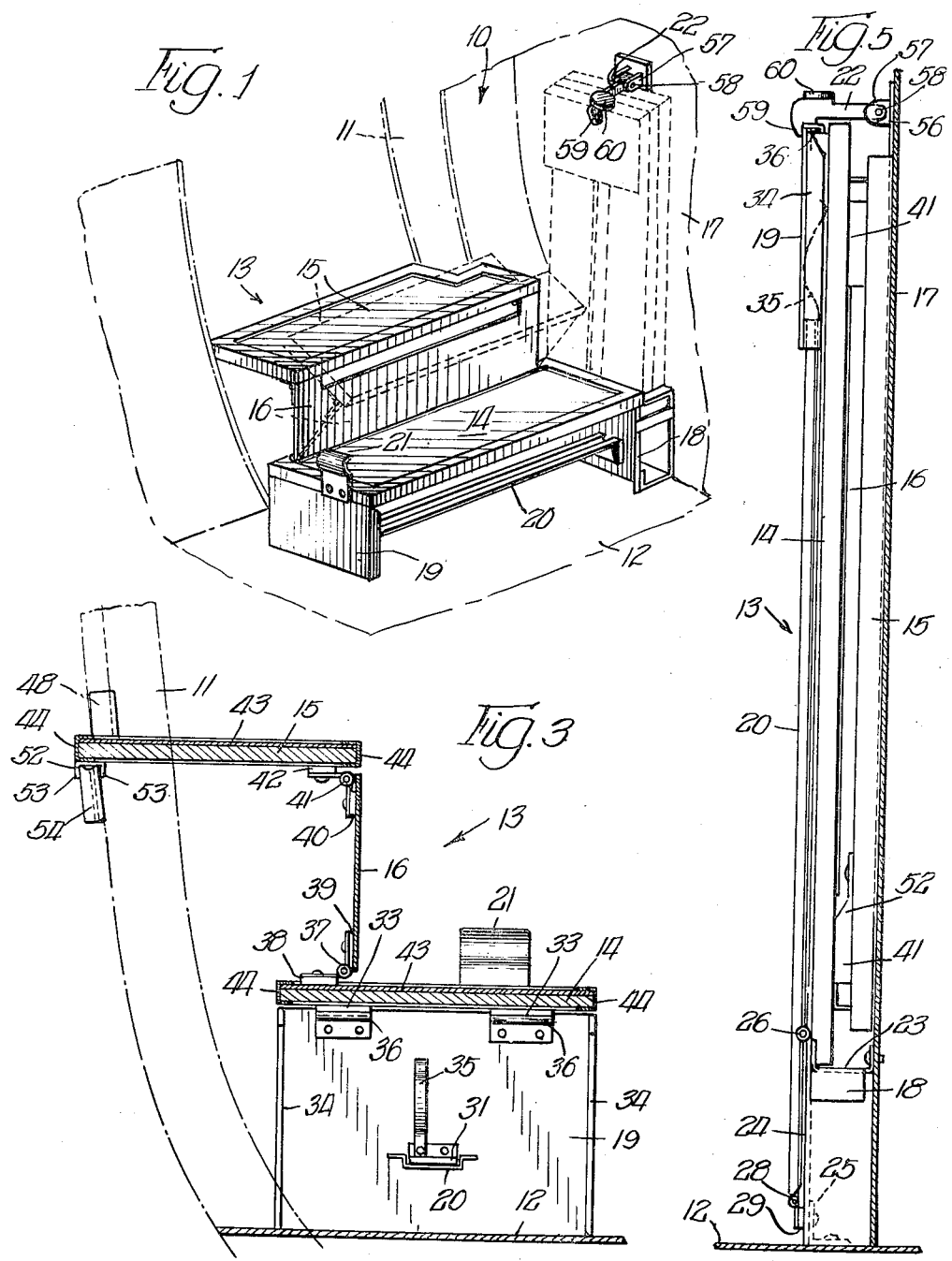

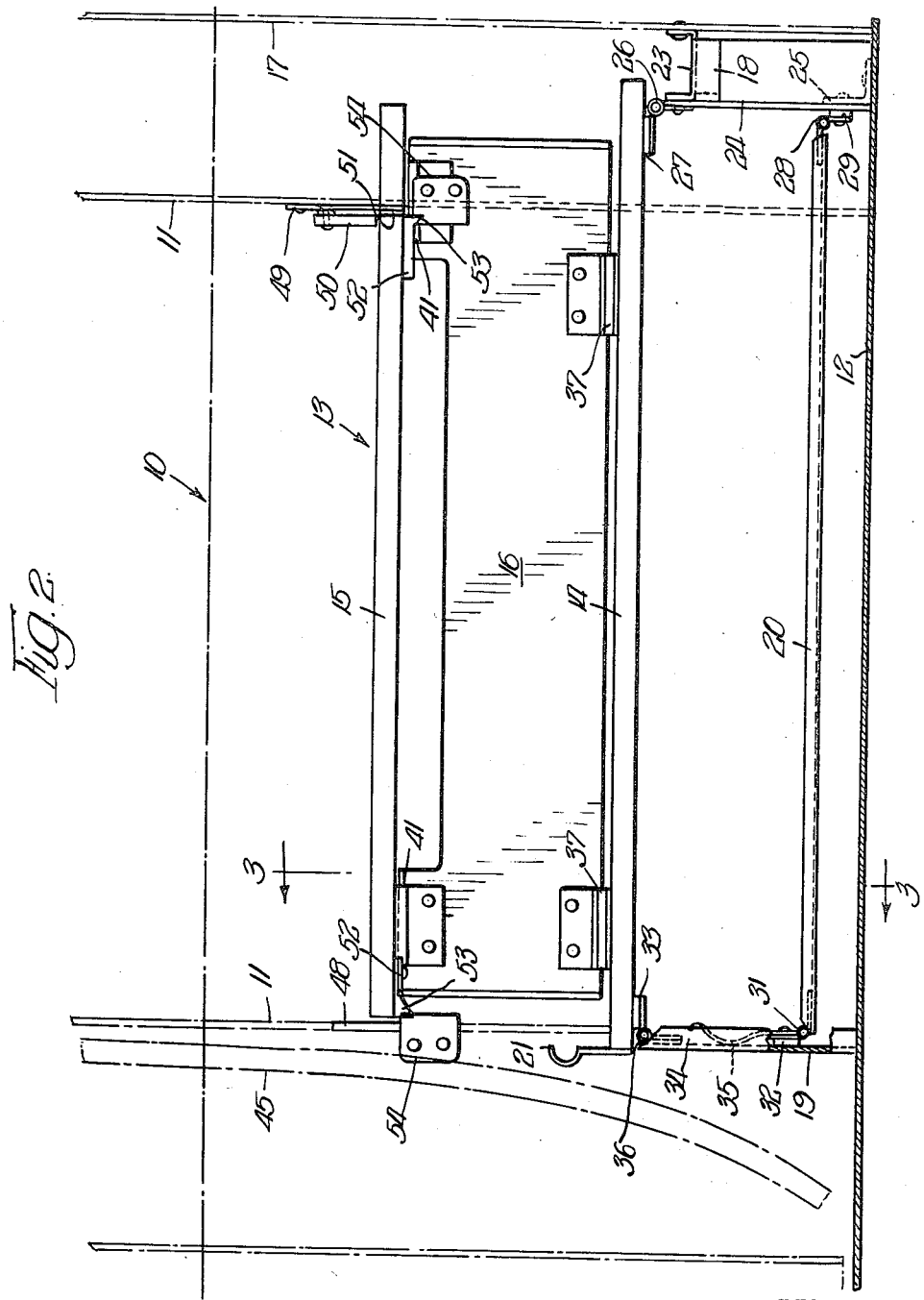

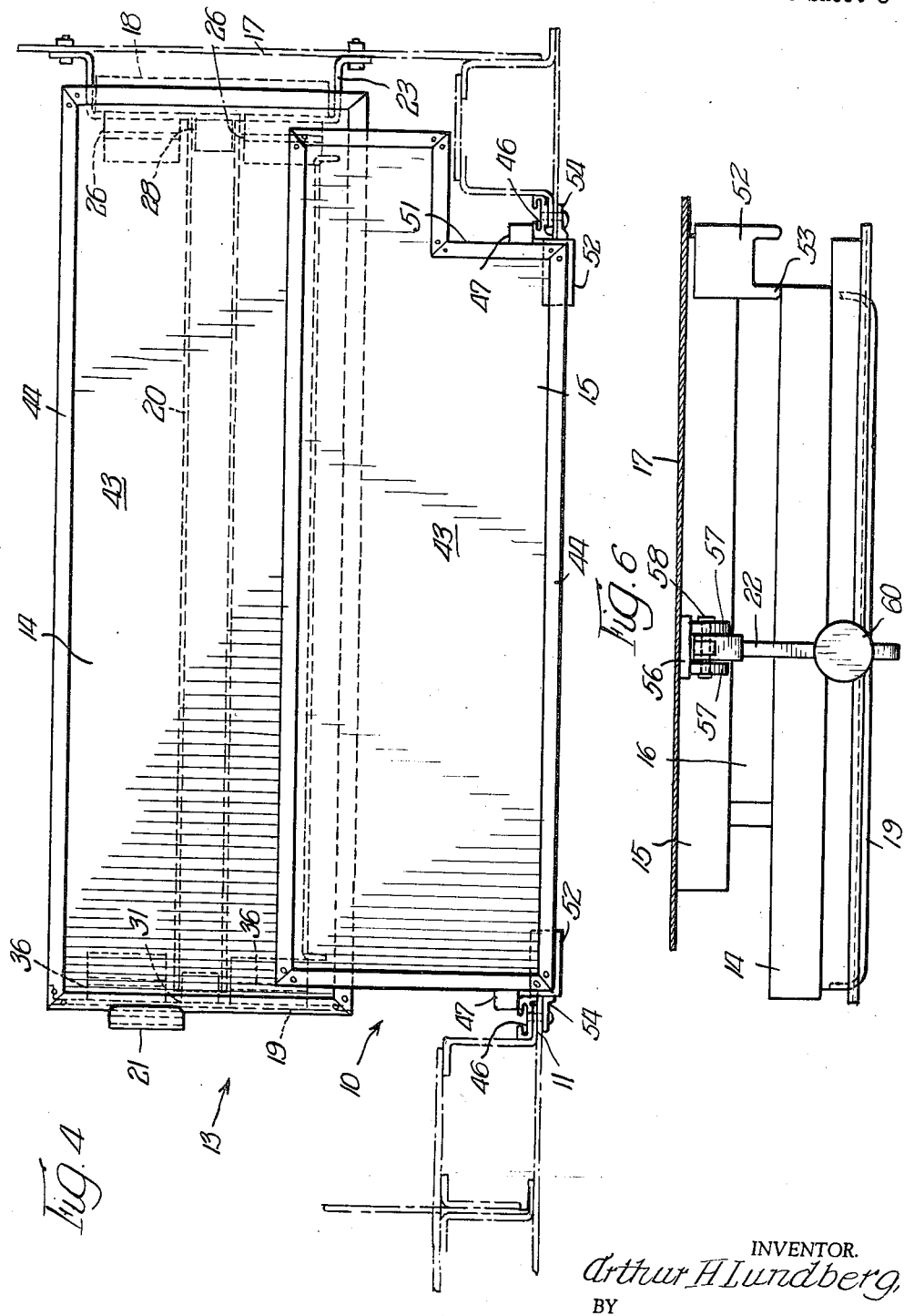

2,941,483

VEHICLE FOLDING STEP ASSEMBLY

Arthur H. Lundberg, Chicago, Ill., assignor to Pullman-Standard Car Manufacturing Company, Chicago, Ill., a corporation of Delaware Filed Apr. 5, 1957, Ser. No. 651,014

6 Claims. (Cl. 105—448)

The present invention is directed to a new and improved folding step assembly particularly adapted for use in a doorway of a passenger carrying vehicle, such as a railway car. More specifically, the present invention is directed to a new and improved folding step assembly including a plurality of step forming members hingedly interconnected and arranged for step structure formation in their unfolded condition while being readily foldable into a collapsed or folded state for pivotal movement into storing position out of obstructing relation with a door structure.

Recent improvements in railway car design include the development of a tubular, lightweight, high speed railway car utilizing operational features of an improved nature. Every effort has been made to provide a car with structures readily adapted for use under varying conditions and thus meet all operational requirements without the need of relying upon customized design. In this respect, a railway car is operated through many different terminals or passenger stations under normal conditions of use and the height of the loading and unloading platforms of different stations vary considerably. In certain instances it is necessary to load or unload from a platform which is considerably higher than the floor level of the railway car in the vestibule portion thereof. Special step structures must be provided in order to bridge the vertical distance between the two different surfaces. This is particularly true with the advent of the lightweight, high speed railway car having a low center of gravity with its body portion raised but slightly from the level of the track.

In order to provide equipment capable of meeting the various operational requirements, such as attendant in operating a low slung railway car between stations having platforms of variable height, it is preferable to make use of a step assembly which can be readily stored in an inoperative position for use only where a particular platform is of a gear height than the vehicle floor. An efficiently operating step assembly must be capable of storage without interfering with free movement through the vestibule or door structure while being completely readily available for movement into its operative position in order to bridge the vertical distance between the vestibule floor level and the top of the platform. Still further, such a step assembly should be of uncomplicated lightweight construction capable of supporting substantial weight applied thereto while being readily and easily movable into and out of its operative position.

Another important requisite of a step assembly is its adaptability for use with any type of vestibule design. In this connection, standard vestibule design makes use of a hingedly mounted door, the bottom edge of which overhangs a trap door arrangement which covers a step well for use with a low platform which is vertically positioned below the floor level of the vestibule. Where specially designed, mechanically operated, retractable step structures are used to bridge the distance between a low platform and the vehicle floor, the high platform step assembly must be adapted for separate use independently of the low platform step assembly. As a result, a high platform step assembly capable of use in all of the various designs of car bodies must be of such design and functioning that its use or non-use will not interfere with the standard step and door arrangement forming an integral part of the car structure.

It is an object of the present invention to provide a new and improved folding step assembly capable of meeting the aforementioned requirements by being readily foldable into inoperative position in such a manner as to allow full and efficient, uninterrupted use of that portion of the vehicle carrying the assembly, the assembly being further readily unfoldable into operative position to bridge the vertical distance between the vehicle floor and a platform surface.

Another object is to provide a folding step assembly of uncomplicated design and efficient functioning, the assembly including a plurality of step forming members which are foldable relative to one another for placing into an inoperative position relative to a door structure in which position full utility of the door structure and vestibule area surrounding the same is available without interference from the folded step assembly, the assembly being further readily and easily movable into operative position and including its own supporting members which are readily foldable into and out of operative position, the top step forming member thereof being received within a door structure and held in operative position by elements carried by the door structure, which elements are readily disengageable to provide for efficient folding and storing of the step assembly following use of the same.

Still a further object is to provide a new and improved folding step assembly mounted in a vestibule portion of a doorway structure of a vehicle, the vestibule portion having an upwardly directed wall portion positioned at one side of the doorway structure for receiving the step assembly in its folded and inoperative position to provide for uninterfered use of the vestibule and doorway structure, the step assembly being initially foldable away from the wall portion in crosswise relation to the door structure and having an upwardly and forwardly movable step forming member which in its unfolded relation is engaged with supporting elements carried by the doorway structure and extends thereinto, the step assembly thus being movable into and out of operative position in directions which are at right angles to one another.

Other objects not specifically set forth will become apparent from the following detailed description made in conjunction with the drawings wherein:

Fig. 1 is a fragmentary and partially diagrammatic perspective of the folding step assembly illustrating in full lines the unfolded and operative position of the same and further illustrating in broken lines the folding operation and the inoperative or fully folded position of the assembly;

Fig. 2 is a front elevation of the step assembly in its unfolded and operative position, the relative positioning of the assembly in a vestibule and door structure of a standard railway car being shown in broken lines;

Fig. 3 is a sectional view of the step assembly taken generally along line 3—3 of Fig. 2;

Fig. 4 is a top plan view of the step assembly in its operative position;

Fig. 5 is a side elevation of the step assembly in its folded and inoperative position; and Fig. 6 is a top plan view of the step assembly in its position illustrated in Fig. 5.

While the following description of the folding step assembly of the present invention deals with its use in the vestibule portion of a railway car, it should be understood that the assembly is readily adapted for use with any type of door structure wherein it is desired to bridge the vertical distance between two surfaces, one of the surfaces being the floor level of the door structure. The step arrangement of the present invention is particularly adapted for use in the vestibule portion of a passenger carrying railway car because of its improved features of being capable of foldable storage in an inoperative position wherein full use of the vestibule and door structure as well as related movable structural parts of the railway car can be retained without interference. For example, the folding step assembly of the present invention is readily adapted for use in conventional railway car design wherein a depending permanent step structure forming a part of the car body is enclosed at the top thereof by a hingedly mounted trap door. The inoperative positioning of the folding step assembly allows its use in any standard type of railway car construction as previously discussed.

Referring to Fig. 1, a vestibule portion 10 adjacent a door structure 11 of a railway car of tubular outline is partially illustrated, the floor 12 of the vestibule 10 extending up to the door structure 11, the floor portion immediately adjacent the door structure being defined by a trap door or other movable surface portion depending upon the construction of a particular railway car. The folding step assembly 13 constituting the essence of the present invention is illustrated in full lines in Fig. 1 in its unfolded, operative condition being provided with two vertically spaced step forming members 14 and 15, the step forming member 15 being positioned forwardly of the member 14 and having its foremost edge portion received within the door structure 11. A vertically positioned riser 16 is hingedly attached intermediate the steps 14 and 15. The vestibule portion 10 is partially defined inwardly of the door structure by a vertically directed vestibule end sheet 17 which is positioned to one side of the door structure 11 and which extends upward from the floor 12. The vestibule end sheet 17 has attached thereto a step assembly supporting structure 18 to which is hingedly attached a side margin of the lowermost step forming member 14. The opposite side margin of the step 14 has hingedly attached thereto a vertically directed end support 19 which in turn is hingedly interconnected with the assembly supporting structure 18 by a transverse spacer 20.

The assembly 13 is foldable into inoperative position by accordion folding of the uppermost step 15 and step riser 16 onto the top surface of the lowermost step 14. An intermediate position of the folding operation is shown in Fig. 1 in broken lines. The free edge of the lowermost step 14 is provided with a lifting handle 21 which is grasped to lift the entire assembly to pivot the same in a direction crosswise of the door structure 11 into the collapsed and folded storage position shown in broken lines in Fig. 1. A latch 22 is suitably carried by the vestibule end sheet 17 to engage the top of the folded assembly and hold the same in its inoperative position in substantially parallel relation with the vestibule end sheet 17. The operation of the assembly 13 is the reverse of that already described for unfolding the same and moving the various elements thereof into their operative positions. From the foregoing brief description, it will be appreciated that the operational folding and unfolding directional movements of the various elements of the assembly include movements toward and away from the door structure 11 and crosswise relative thereto.

The specific structural details of the embodiment illustrated are particularly shown in Figs. 2–4. The vestibule end sheet 17 at the lower portion thereof in association with the vestibule floor 12 carries a bracket-like closing plate 23 attached at one end thereof to the end sheet 17 and at the other end thereof to a vertically directed plate 24. The plate 24 at the lowermost end thereof is attached to the floor 12 by an angle 25 and in combination with the closing plate 23 defines the assembly supporting structure 18. A pair of spaced hinges 26 are attached by their oppositely directed hinge plates to the vertical plate 24 and spacer blocks 27 which are carried on the bottom surface of the step 14 near the innermost side edge thereof. The bottom portion of the vertical plate 24 has attached thereto one plate of a hinge 28 spaced from the surface of the plate 24 by a filler or spacer 29. The opposite plate of the hinge 28 is attached to an adjacent end of the spacer element 20 which extends substantially the full width of the step 14 in vertically downwardly spaced relation thereto when the assembly is in its unfolded, operative position.

The spacer 20 as particularly shown in Fig. 3 is channel-shaped for strengthening purposes and the opposite end thereof is suitably attached to one plate of a hinge 31. The opposite hinge plate of the hinge 31 is attached to a spacer or filler 32 which in turn is carried by the inner surface of the end support 19. The side margins of the end support 19 are defined by inwardly directed flanges 34 and a substantially U-shaped tension spring 35 is suitably attached thereto for a purpose to be described. The lowermost edge of the end support 19 is in resting engagement with the top surface of the vestibule floor 12 and is readily movable out of engagement therewith upon lifting of the step assembly into its inoperative position against the vestibule end sheet 17. The flanged side margins 34 serve to provide adequate stability to the end support 19 to provide for proper support of the free end of the step 14.

The upper margin of the end support 19 has a hinge plate of each of a pair of hinges 36 attached thereto, the opposite plate of each hinge 36 being attached by a filler or spacer 33 to the bottom surface of the step 14. With the provision of the hinges 26, 28, 31 and 36, a collapsible or foldable box-like structure is defined by the step 14, plate 24, spacer element 20 and end support 19. Thus, upon lifting of the step 14 by the handle 21 and pivoting the same about the hinges 26 upwardly toward the vestibule end sheet 17, the end support 19 and spacer 20 pivot relative to one another by reason of their hinge connections toward coplanar relation with one another as shown in Fig. 5. The tension spring 35 comes into engagement with the bottom surface of the step 14 and is placed under tension to urge the end support 19 in an outward direction to cause the same to initially pivot about the hinges 36 and thus break the coplanar relation between the same and the spacer in jackknife fashion when the assembly is initially moved from its inoperative position as shown in Fig. 5 toward its operative position originally described. Thus, with the initial jackknife action occurring between the end support 19 and the spacer 20, the two elements are caused to move into right angled relation to form the box-like structure particularly illustrated in Fig. 2. By reason of the relative positioning of the end support 19 and spacer 20 and the hinge connections thereof, relative movement between the same is consistent at all times and the end support 19 is automatically moved by the spacer 20 into its vertical position to support the free end of the step 14 when the assembly is unfolded.

As particularly shown in Fig. 3, the forward top surface of the step 14 has attached thereto a pair of spaced hinges 37, the hinge plates of which are spaced from the step 14 by fillers 38. The opposite hinge plate of each hinge 37 is attached by a spacer or filler 39 to the step riser 16 which extends vertically upwardly intermediate the steps 14 and 15 to enclose the vertical area therebetween. The upper edge portion of the riser 16 has attached thereto through spacers 40 the hinge plates of hinges 41 which are spaced from one another near the side margins of the riser 16. The remaining hinge plates of the hinges 41 are attached through spacers 42 to the bottom surface of the uppermost step 15.

With the hinged interconnection of the steps 14 and 15 through the riser 16 as described, the uppermost step 15 may be readily moved rearwardly and downwardly into resting relation with the top surface of the lowermost step 14, the riser 16 being positioned intermediate the folded steps 14 and 15 as shown in Figs. 5 and 6. The step 15 and riser 16 are thus accordion folded relative to the step 14 and this particular folding action is in a direction toward or away from the door structure 11 as previously described. Each of the steps 14 and 15 is provided with a top thread covering 43 held onto the structural base by peripherally received channel clamping pieces 44. The thread covering 43 may be formed from any suitable material preferably provided with frictional producing means to prevent slipping on the steps during use of the same.

As particularly shown in Fig. 4, the door structure 11 is of known structural arrangement including a door casing onto which a suitable door structure 45 is hung for movement into the vestibule 10 as shown. Inwardly of the door casing on each side of the door structure 11 is a resilient sealing strip 46 which is engaged by a rubber bumper 47 mounted on each of the outer side edges of the step 15. The forward edge portion of the step 15 extends at least partially through the door structure 11 and upon movement of the step 15 into its operative position, the rubber bumpers 47 limit the extent to which the step moves through the door structure 11 while at the same time protecting the step 15 from damage.

As shown in Figs. 2 and 3, each side of the door structure 11 carries a striker plate 48 and 49, the latter plate 49 further carrying a pivotal safety stop lever 50 which overhangs the top forward surface of the step 15. As particularly shown in Fig. 4, one side margin of the top step 15 is inwardly recessed to define a cut-away portion 51 allowing a substantial portion of the step 15 to be as wide as the step 14 while permitting the forward edge portion of the step 15 to fit into the door structure 11. The corners of the forward end portion of the step 15 are each provided with a channel-shaped keeper 52 provided with downwardly directed spaced flange portions 53 overlapping opposite side margins of a step support 54 carried on each side of the door structure 11. The overlapping of the flange-like projections 53 of each keeper of the opposite surfaces of each support 54 holds the step 15 against forward or rearward movement relative to the step 14 thus providing a rigidly supported structure when the assembly is in its operative position.

The pivotally mounted lever 50 shown in Fig. 2 when in place directly above the forward top surface of the step 15 prevents the step from being inadvertently moved upwardly to an extent that the keepers 52 become disengaged from the supports 54. When the forward edge of the step 15 is introduced into the door structure 11, the lever 50 is automatically pivoted outwardly so as not to interfere with proper engagement between the keepers 52 and the supports 54. However, due to the pivotal mounting of the lever toward the upper end thereof, the lever 50 will ultimately return to its vertical position to abut the top surface of the floor 15 upon inadvertent upward movement of the same. In freeing the forward edge of the step 15 for folding of the assembly, it is necessary merely to rotate the lever 50 out of operative position and lift the forward edge of the step 15 until the flanged projections 53 of the keepers 52 clear the top surfaces of the supports 54. The step 15 and riser 16 are then free for rearwardly directed accordion folding onto the top surface of the step 14.

In line with the foregoing description, it should be apparent that the folding step assembly is readily and easily movable into its unfolded and fully operative position. Little if any instruction is necessary in order to properly acquaint the operator with the manner in which the assembly functions. Upon folding and moving of the step structure into its inoperative position in substantially parallel relation with the vestibule end sheet 17, the door 45 may be readily opened or closed without interference from the step assembly.

Referring to Figs. 5 and 6, a latch base 56 is mounted above the folded step assembly 13 on the vestibule end sheet 17. The base 56 carries a pair of outwardly directed spaced ears 57 which receive therebetween the end of the latch 22. The latch is pivotally attached to the ears 57 by a pin 58 and the forward end of the latch is provided with a downwardly depending hook portion 59 which engages the top outer surface of the end support 19 as previously described. The latch 22 is further provided with a disk-like latch lift 60 which is readily grasped to lift the latch 22 out of engagement with the end support 19 and thus allow the step assembly 13 to move into its unfolded and operative position. In this manner the step assembly is readily held in its inoperative position to one side of the vestibule 10 and door structure 11 thus allowing full uninterrupted use of the vestibule and door structure. The weight of the assembly in its folded condition is carried by the assembly supporting housing 18 previously described.

The various hingedly attached elements of the step assembly cooperate with one another to provide a strong structure capable of supporting substantially heavy loads while at the same time the structural arrangement incorporates lightweight features allowing the assembly to be easily moved or lifted in folding or unfolding the same. The step supporting arrangement forming a part of the door structure does not interfere with full and efficient use of a door carried thereby and when cooperating with the forward portion of the top step provides connection and supporting arrangements allowing safe and efficient use of the assembly. The step assembly is arranged so that the forward edge of the top step will not extend beyond the outermost extension of the car body. Consequently, if the assembly is left in its operative unfolded position during operation of the car, no portions of the same will extend beyond the side of the car to be possibly damaged upon contact with objects or structures maintained in close proximity to the roadbed.

Obviously many modifications and variations of the invention as hereinbefore set forth may be made without departing from the spirit and scope thereof, and therefore only such limitations should be imposed as are indicated in the appended claims.

I claim:

1. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically and horizontally forwardly spaced relation in an upwardly direction toward said door structure when said assembly is unfolded and for accordion folding into resting relation with the top surface of the lowermost of said step members, the lowermost of said step members being hingedly attached to means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, the uppermost of said step members being provided with means for supporting the same and rigidifying said assembly when the same is unfolded and in fully operative position.

2. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically spaced forwardly positioned relation in an upwardly direction toward said door structure when assembly is unfolded and for accordion folding into resting relation with the top surface of the lowermost of said step members, the lowermost of said step members being hingedly attached to assembly supporting means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, the uppermost of said step members being provided with means for supporting the same when said assembly is unfolded and in fully operative position, the edge portion of said lowermost step member opposite said wall portion being provided with a retractably foldable end support for vertical support with said floor when said assembly is unfolded, and a spacer element hingedly attached at its ends to said end support and said assembly supporting means for folding into substantially parallel relation with said end support and the bottom surface of said lowermost step member when said assembly is folded.

3. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically spaced forwardly positioned relation in an upwardly direction toward said door structure when said assembly is unfolded and for accordion folding into resting relation with the top surface of the lowermost of said step members, the lowermost of said step members being hingedly attached to assembly supporting means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, the uppermost of said step members being provided with means for supporting the same when said assembly is unfolded and in fully operative position, the edge portion of said lowermost step member opposite said wall portion being provided with a retractably foldable end support for vertical support with said floor when said assembly is unfolded, and a spacer element hingedly attached at its ends to said end support and said assembly supporting means for folding into substantially parallel relation with said end support and the bottom surface of said lowermost step member when said assembly is folded, the edge portion of said lowermost step member opposite said wall portion being further provided with handle means for lifting said assembly into parallel relation with said wall portion, said wall portion carrying assembly holding means for detachable holding of said assembly when folded.

4. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically spaced forwardly positioned relation in an upwardly direction toward said door structure when said assembly is unfolded and for accordion folding into resting relation with the top surface of the lowermost of said step members, the lowermost of said step members being hingedly attached to assembly supporting means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, the edge portion of said lowermost step member opposite said wall portion being provided with a retractably foldable end support for vertical support with said floor when said assembly is unfolded, the forward edge portion of the uppermost step member being received by said door structure when said assembly is unfolded, step support means carried by said door structure, and support engaging means carried by said forward edge portion to prevent forward and rearward movement of said uppermost step member.

5. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically spaced forwardly positioned relation in an upwardly direction toward said door structure when said assembly is unfolded and for accordion folding into resting relation with the top surface of the lowermost of said step members, the lowermost of said step members being hingedly attached to assembly supporting means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, the edge portion of said lowermost step member opposite said wall portion being provided with a retractably foldable end support for vertical support with said floor when said assembly is unfolded, the forward edge portion of the uppermost step member being received by said door structure when said assembly is unfolded, step support means carried by said door structure, support engaging means carried by said forward edge portion to prevent forward and rearward movement of said uppermost step member, and stop means carried by said door structure in movable overhanging relation to the top forward surface portion of said uppermost step member to prevent upward movement of the same.

6. In a vehicle vestibule portion defined by a door structure, floor, and a transverse upstanding wall portion located to one side of said door structure, the provision of a folding step assembly comprising a plurality of step members hingedly interconnected by vertically positionable means to locate said step members in vertically spaced forwardly positioned relation in an upwardly direction toward said door structure when said assembly is unfolded and for accordion folding into resting relation with the top surface of the lowermost of step members, the lowermost of said step members being hingedly attached to assembly supporting means attached to said wall portion for pivotal movement toward said wall portion into substantially parallel relation thereto when said assembly is folded, the top surface of said lowermost step member receiving the remaining step members and vertically positionable means in accordion folded relation prior to pivotal movement of the same into parallel relation with said wall portion, said vertically positionable means constituting a step riser when said assembly is unfolded, the edge portion of said lowermost step member opposite said wall portion being provided with a retractably foldable end support for vertical support with said floor when said assembly is unfolded, and a spacer element hingedly attached at its ends to said end support and said assembly supporting means for folding into substantially parallel relation with said end support and the bottom surface of said lowermost step member when said assembly is folded, the forward edge portion of the uppermost step member being received by said door structure when said assembly is unfolded, step support means carried by said door structure, support engaging means carried by said forward edge portion and overlapping the inner and outer surfaces of said support means to prevent forward and rearward movement of said uppermost step member, and stop means carried by said door structure in movable overhanging relation to the top forward surface portion of said uppermost step member to prevent upward movement of the same.

References Cited in the file of this patent

UNITED STATES PATENTS

| | | |
|---|---|---|
| 953,538 | Massey | Mar. 29, 1910 |
| 996,201 | Blake | June 27, 1911 |
| 1,129,238 | Seitz | Feb. 23, 1915 |
| 1,168,464 | Beck | Jan. 18, 1916 |
| 1,196,568 | Macfadden | Aug. 29, 1916 |
| 1,725,438 | Brand | Aug. 30, 1929 |
| 2,324,507 | Johnson | July 20, 1943 |
| 2,636,549 | Geller | Apr. 28, 1953 |
| 2,650,145 | Sieminski | Aug. 25, 1953 |